United States Patent [19]

Rose et al.

[11] 3,874,072

[45] Apr. 1, 1975

[54] SEMICONDUCTOR STRUCTURE WITH BUMPS AND METHOD FOR MAKING THE SAME

[75] Inventors: Ralph E. Rose, San Jose, Calif.;

[73] Assignee: Signetics Corporation, Sunnyvale, Calif.

[22] Filed: Aug. 27, 1973

[21] Appl. No.: 392,112

Related U.S. Application Data

[62] Division of Ser. No. 238,116, March 27, 1972, Pat. No. 3,821,785.

[52] U.S. Cl. .......................... 29/578, 29/591, 29/580

[51] Int. Cl. .......................... B01j 17/00

[58] Field of Search .......................... 29/578, 579, 580, 591, 29/589

[56] References Cited

UNITED STATES PATENTS

| | | | |
|---|---|---|---|
| 3,429,029 | 2/1969 | Langdon | 29/589 |
| 3,480,412 | 11/1969 | Duffek | 29/580 |
| 3,585,461 | 6/1971 | Eynon | 29/591 |
| 3,689,332 | 9/1972 | Dietrich | 29/579 |

*Primary Examiner*—Roy Lake
*Assistant Examiner*—W. C. Tupman
*Attorney, Agent, or Firm*—Flehr, Hohbach, Test, Albritton & Herbert

[57] ABSTRACT

Semiconductor structure having a semiconductor body with a planar surface and with metallic contact pads formed over the surface. A layer of insulating material is formed over the contact pads. Bumps or pillars are formed which extend through the layer of insulating material and are bonded to the contact pads. The bumps or pillars are formed of a relatively ductile aluminum layer. A base portion is secured to the ductile layer and has a mushroom-shaped configuration. Gold-tin layers are carried by the base and form a gold-tin system so that the bumps or pillars can be readily bonded to the lead frames.

In the method, a semiconductor body is provided having a planar surface and having metallic contact pads formed over the surface. An insulating layer is formed over the contact pads. Openings are formed in the insulating layer. Bumps or pillars are formed which extend through the openings in the insulating material and make contact with and are secured to the pads. The bumps or pillars are formed by first forming a relatively thick aluminum layer making contact with the pads and then forming bases which are secured to the relatively thick aluminum layers. Gold-tin layers are formed on the bases to provide a gold-tin system. During the formation of the base and the gold-tin layers, a layer of photoresist is provided so that the bumps or pillars assume a mushroom-shaped configuration.

12 Claims, 18 Drawing Figures

SEMICONDUCTOR STRUCTURE WITH BUMPS AND METHOD FOR MAKING THE SAME

This is a division, of application Ser. No. 238,116 filed Mar. 27, 1972 now U.S. Pat. No. 3,821,785.

BACKGROUND OF THE INVENTION

Attempts have heretofore been made to provide bumps or pillars on semiconductor devices to overcome the disadvantages of conventional bonding by the use of thin gold wires. However, it has been found with such bumps or pillars that when they are placed under thermal stress they have a tendency to shear off. In cases where the pillar did not shear off, there were cases where the pillars or bumps would break. There is, therefore, a need for a new and improved pillar or bump construction which can be utilized in connection with semiconductor structures.

SUMMARY AND OBJECTS OF THE INVENTION

The semiconductor structure consists of a semiconductor body which has a planar surface having metallic contact pads formed over the surface. A layer of insulating material overlies the contact pads. The layer is provided with windows overlying the pads and exposing the pads. A relatively thick ductile layer of aluminum is formed on said layer of insulating material and extends into said opening and makes contact with said contact pads. A base is secured to said relatively thick aluminum layer and has a surface spaced a substantial distance above the aluminum layer. Gold-tin layers are carried by the base. The base with the gold-tin layers form bumps or pillars which can be utilized for bonding the semiconductor body to a lead frame. The bumps or pillars are shaped so that the gold does not come into contact with the aluminum.

In general, it is an object of the present invention to provide a semiconductor structure which is provided with bumps or pillars which can withstand thermal cycling without breaking or shearing.

Another object of the invention is to provide a semiconductor structure of the above character in which nickel is utilized in the bump or pillar construction and in which means is provided for preventing diffusion of the nickel through the aluminum.

Another object of the invention is to provide a structure and method of the above character in which chromium is utilized to prevent nickel from diffusing into the aluminum.

Another object of the invention is to provide a structure and method of the above character in which the chromium is protected by a nickel layer.

Another object of the invention is to provide a structure and method of the above character in which the gold-tin eutectic can be shifted to accommodate various types of packaging for the semiconductor structure.

Another object of the invention is to provide a structure and method of the above character in which the tin is protected by the gold so that it cannot oxidize.

Another object of the invention is to provide a structure and method of the above character in which the aluminum layer remains ductile.

Another object of the invention is to provide a structure and method of the above character which uses a controlled collapse reflow soldering system in bonding the bumps to leads extending to the outside world.

Additional objects and features of the invention will appear from the following description in which the preferred embodiments are set forth in detail in conjunction with the the accompanying drawings.

BRIEF DESCRIPTION OF THE PREFERRED EMBODIMENT

The process and method for fabricating a semiconductor structure with bumps incorporating the present invention is shown in FIGS. 1 through 18. In connection with the process, a semiconductor body 21 of a suitable type such as one formed of silicon is utilized. It is assumed in connection with the present invention process that all of the processing steps required to complete the semiconductor device or integrated circuit in the semiconductor body 21 have been completed in a manner well known to those skilled the art such as shown in U.S. Pat. No. 3,619,739. Typically, the silicon is provided with an impurity of one conductivity type therein. Regions of opposite impurity are formed in the semiconductor body either by diffusion or ion implantation to provide dish-shaped regions (not shown) defined by PN junctions which are also dish-shaped and which extend to the planar surface 22 of the semiconductor body. Typically, the semiconductor body itself would serve as the collector and the first region of opposite conductivity type would serve as the base of a transistor. A region of first conductivity type would then be formed within the region of opposite conductivity type also defined by a dish-shaped PN junction extending to the surface 22 to provide the emitter of the transistor. Other devices can be formed in the semiconductor body simultaneously or at different times as, for example, diodes or resistors and the like to provide the desired integrated circuit.

Figure 17:
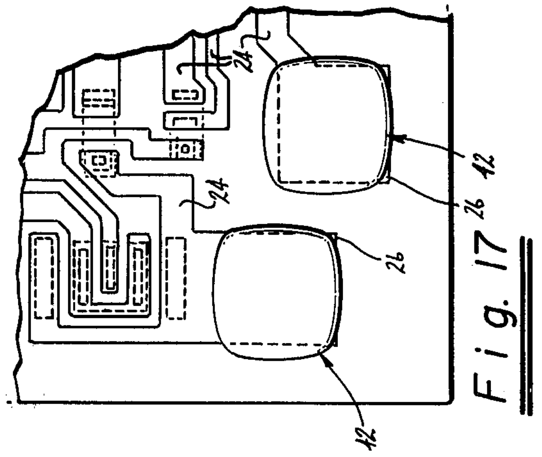
FIG. 17 is a plan view of a portion of an integrated circuit having bumps or pillars formed thereon incorporating the present invention.
Figure 13:
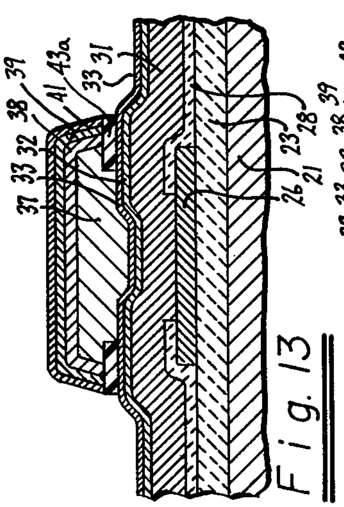
Figure 14:
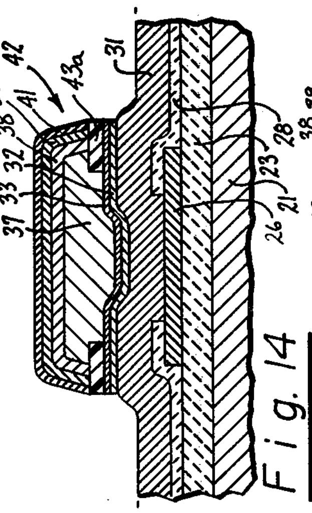
Figure 15:
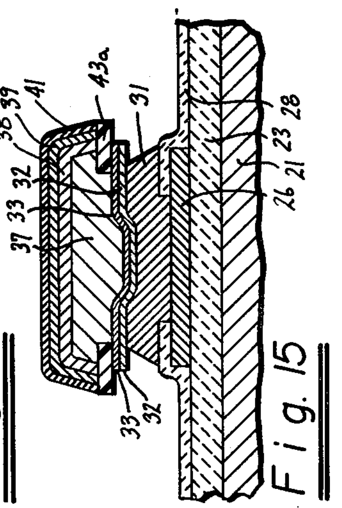

After the devices have been formed an insulating layer 23 of a suitable material such as thermally grown silicon dioxide is formed on the surface 22. Thereafter, openings are formed in the layer 23 to expose portions of the surface 22 overlying portions of said regions forming the semiconductor devices. A layer of metal of a suitable type such as aluminum is then evaporated onto the surface of the layer 23 and into the openings which have been formed in the layer 23 to make contact with said regions. By the use of a mask and suitable photolithographic techniques, the undesired metal is removed so that there remain leads 24 which are adherent to the surface of the insulating layer 23. The leads extend into and are formed integral with pads 26 which are generally rectangular in shape. As shown in FIG. 17, the pads 26 are spaced around the outer periphery of the semiconductor body 21 and the leads 24 extend inwardly from the pads to make contact with the various regions of the devices forming the integrated circuit. The pads are generally rectangular in shape and also are formed of the same material as the leads as, for example, aluminum. The aluminum is formed to a suitable thickness as, for example, 1 micron. The semiconductor structure in this stage is shown in FIG. 1 and as thus far described is conventional.

Figures 1, 2, 3, 4, 5, 6, 7, 8, 9, 10, 11, 12:
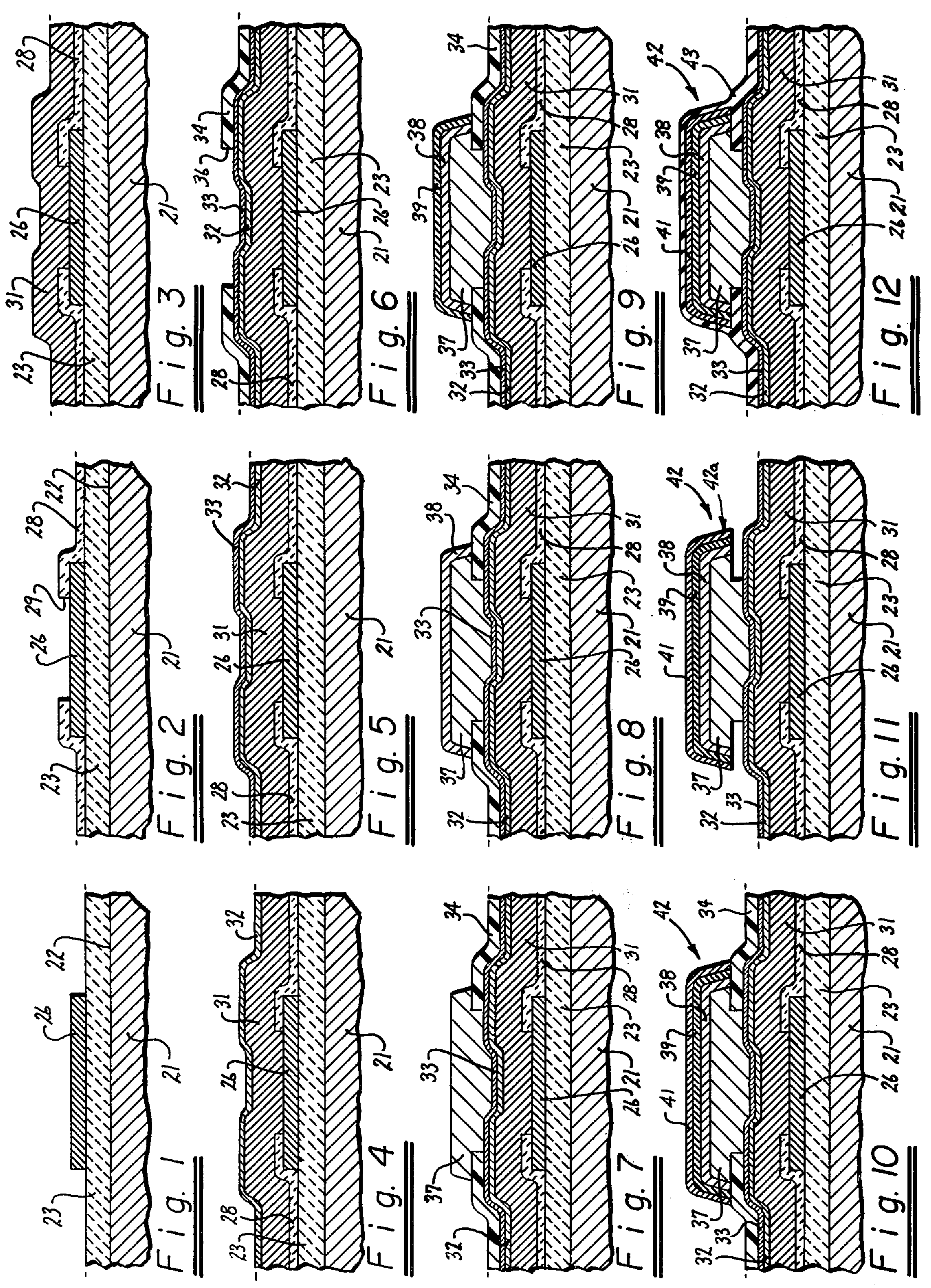
FIGS. 1 – 16 are cross-sectional views showing the steps utilized for fabricating semiconductor structures having bumps or pillars incorporating the present invention.
Figure 16:
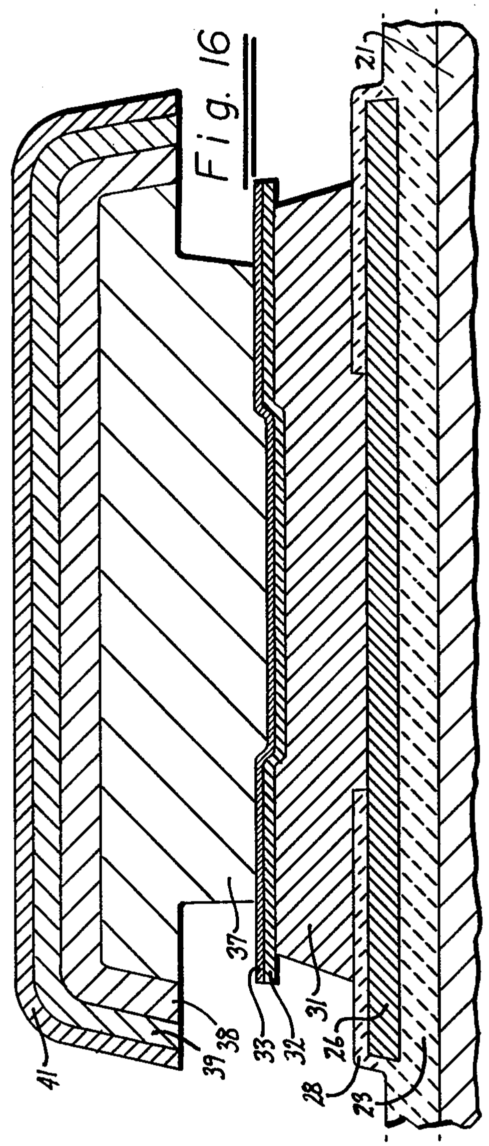
Figure 18:
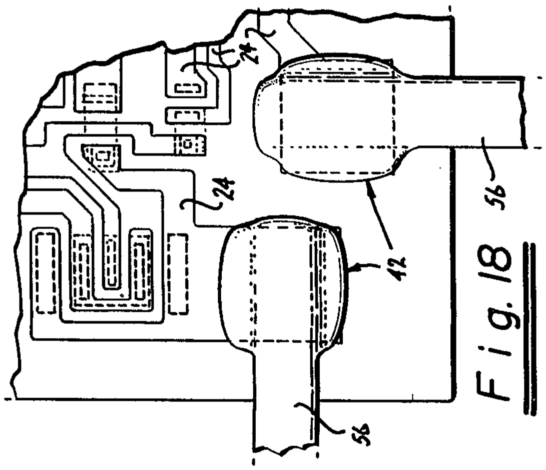
FIG. 18 is a plan view of a portion of an integrated circuit in which the bumps have been secured to the leads leading to the outside world.

Thus, the present process commences with the steps shown in FIG. 2 in which a layer 28 of glass is deposited over the surface of the silicon dioxide layer 23 and also over the lead structure 24 and the pads to a suitable thickness, as, for example, 1 micron. Contact windows or openings 29 are then formed in the glass layer 28 which overlie and expose portions of the pads 26 so that contact can be made to the pads. The formation of the windows or openings 29 is accomplished in a conventional manner such as by utilizing a mask and a suitable negative photoresist such as KTFR. The photoresist is exposed through the mask and the undesired portion of the photoresist removed so that a photoresist mask is provided to permit etching of the glass with a suitable solution such as an HF ethylene glycol water solution with a minimum of attack on the alluminum. After the etching is completed, the photoresist is removed by an organic stripper.

It should be pointed out that at the stage of the semiconductor structure shown in FIG. 1, the alloying step normally practiced after metallization has not been carried out. Rather, the alloying step is carried out after the glass has been deposited in FIG. 2. This alloying step serves two functions: one, it provides a strong bond between the deposited glass and the aluminum interconnect structure; and two, it helps to provide a clean surface on the deposited glass. This latter function is accomplished because the alloying step removes any traces of photoresist residue which have not been removed chemically. It is important that the exposed surface of the deposited glass be as clean as possible to obtain a maximum adhesion between the aluminum layer thereafter deposited, and the layer 28. The alloying step is carried out at a suitable temperature such as from between 450° to 500°C. for a suitable period of time as, for example, one-half hour.

After the windows 29 have been formed, and the alloying has been completed, another layer 31 of suitable metal such as high purity aluminum is deposited over the entire surface of the glass layer 28 and into the openings 29 as shown in FIG. 3. The purities of the aluminum should be at least 99.9% or above, and preferably 99.99% or above. This aluminum layer can have a suitable thickness ranging from 3 to 5 microns and preferably has a thickness of approximately 3.5 microns.

As shown in FIG. 4, a layer 32 of a suitable material such as chromium is deposited on the aluminum layer 31 to a thickness of between 0.2 and 0.4 of a micron and preferably approximately 0.3 of a micron. The chromium is deposited in a suitable manner such as by evaporating the same in a vacuum chamber having the semiconductor wafers therein. Other materials other than chromium can possibly be used. However, it is necessary that the material which is utilized for this layer provide a diffusion barrier between nickel and aluminum. In addition, it must not react with aluminum or nickel to any considerable extent. In addition, the material should be such that it can be etched in the presence of the other metals. The material also should have good chemical resistance. Chromium meets all these criteria and, in addition, has the ability to form a good oxide. In addition, chromium is not easily damaged by the environment.

After the chromium layer 32 has been deposited, another layer 33 formed of a suitable material such as nickel is deposited on the chromium layer 32 ranging from approximately 300 Angstroms to 0.3 of a micron and preferably a thickness of approximately 1,000 Angstroms or 0.1 of a micron. The nickel layer 33 is preferably placed over the chromium layer 32 as soon as possible to protect the chromium from oxidation when the semiconductor structure is brought out into the normal atmosphere. Thus, it is preferable that the nickel layer be deposited immediately after the chromium layer during the same pump-down in the vacuum chamber.

As shown in FIG. 6, thereafter a layer 34 of a suitable photoresist is formed on the nickel layer 33. By the use of a mask and suitable photolithographic techniques, openings or windows 36 are formed in the photoresist which immediately overlie the contact pads 26 and the openings 29. These openings or windows are used for the bumps or pillars which are to be formed as hereinafter described. It has been found that with the 3½ micron thickness for the base aluminum layer 31, that it is desirable to utilize an opening or window 36 which is approximately 80 microns square. It has been found that this provides the optimum ductility for the bump base.

Bump stand-offs 37 are formed of a suitable material such as nickel to a suitable height such as 12 microns in a suitable manner such as by electroplating. It is desirable that the bump stand-offs 37 be of a height so that they serve as physical spacers between the surface of the device and the leads to which they are bonded. The stand-offs also should be sufficiently thick so that they serve as barriers for the gold utilized in the bump or pillar structures hereinafter described.

It should be appreciated in determining the height which it is desired to grow the bump stand-offs 37 that the bump stand-offs will grow laterally at the same time that they are growing vertically so that the bump height may be determined by the spacing which is provided between the contact pads 26 of the semiconductor structure.

As shown in FIG. 9, a layer 38 of a suitable material such as gold is electroplated onto the nickel stand-offs to a suitable thickness ranging from 5 to 6½ microns and preferably 6 microns. The thickness of this gold layer is determined by the final solder metallurgy which is desired. The gold layer 38 is covered by a layer 39 of tin also electroplated to a suitable thickness as, for example, ranging from 4.5 to 5.1 microns and preferably 5 microns. A final gold layer 41 is then electroplated onto the tin layer 39 to a suitable thickness ranging from 1.4 to 1.6 microns and preferably to a thickness of approximately 1.5 microns. The primary purpose of the gold layer 41 is to protect the tin layer 39 from oxidation. It also protects the tin layer from certain chemical steps which are utilized in the present process.

After the bumps or pillars have been completed as shown in FIG. 10, the protective photoresist layer 34 is removed in a suitable manner such as by rinsing the semiconductor structure in acetone. It will be noted, that the photoresist is removed from beneath the lower extremities of the outer margin of each of the bumps or